Oct. 31, 1939.  K. J. KORTVELESY  2,177,726
FASTENING DEVICE
Filed Jan. 10, 1936   2 Sheets-Sheet 1
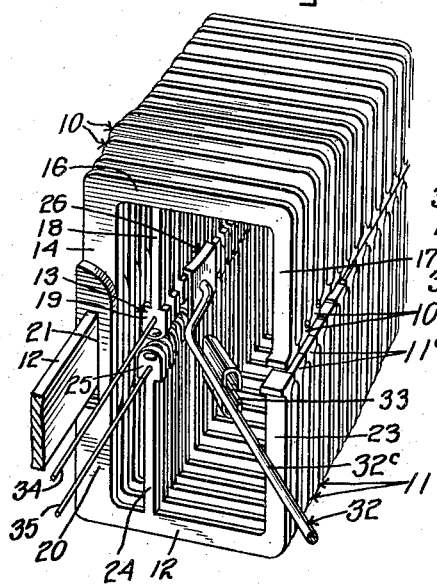
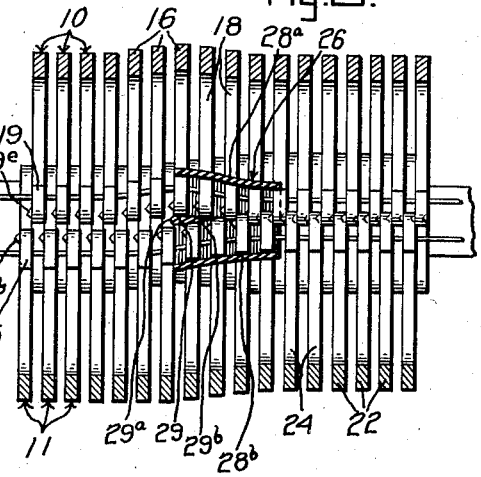
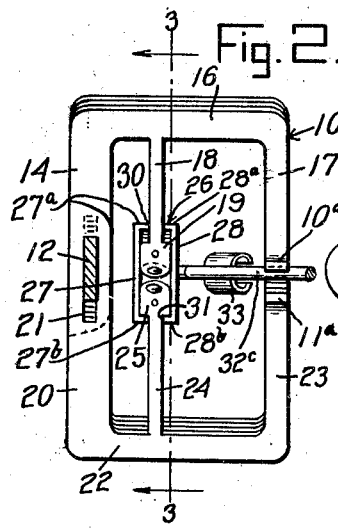
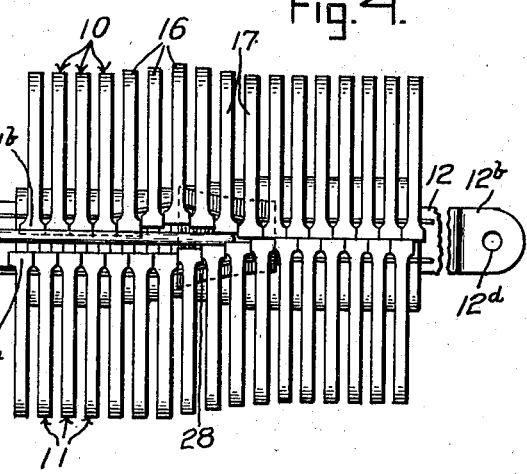
INVENTOR
Kalman J. Kortvelesy
BY
Blair, Curtis & Dunne
ATTORNEYS Oct. 31, 1939.  K. J. KORTVELESY  2,177,726
FASTENING DEVICE
Filed Jan. 10, 1936  2 Sheets-Sheet 2
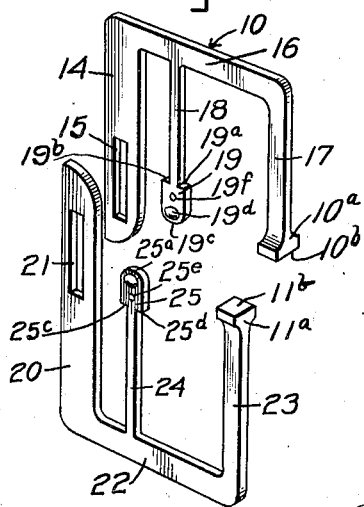
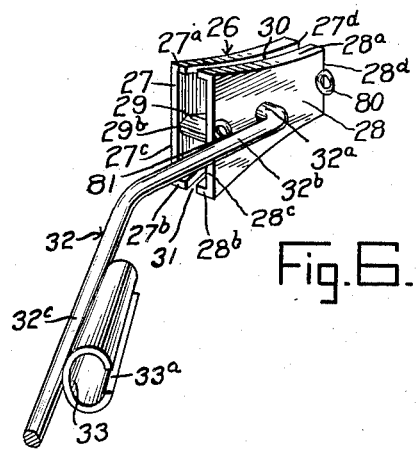
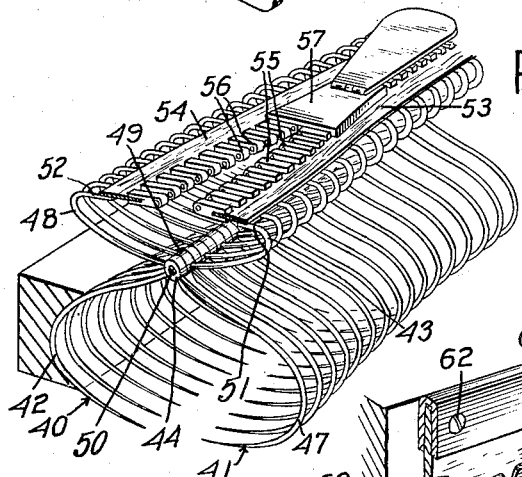
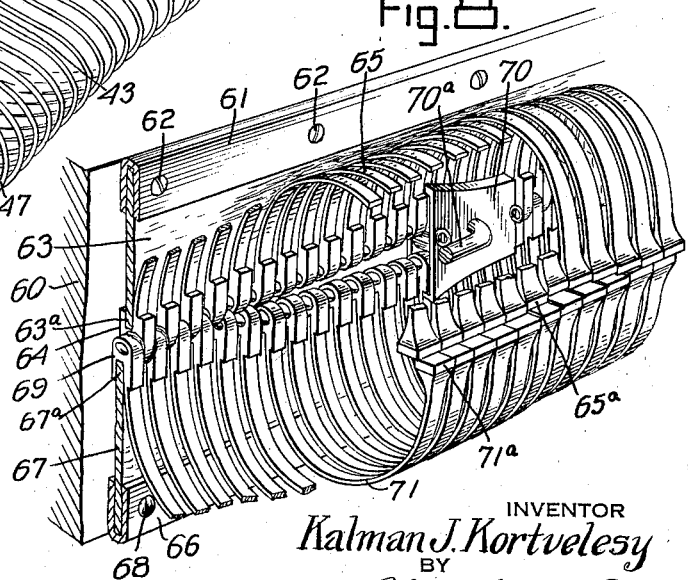
INVENTOR
Kalman J. Kortvelesy
BY
Blair, Curtis & Dunne
ATTORNEYS Patented Oct. 31, 1939

2,177,726

UNITED STATES PATENT OFFICE 2,177,726

FASTENING DEVICE

Kalman J. Kortvelesy, Bayside, N. Y.

Application January 10, 1936, Serial No. 58,499

15 Claims. (Cl. 24—205)

This invention relates to a fastening or gripping device or the like.

One of the objects of this invention is to produce a fastening device or the like which is simple and sturdy in construction and durable under conditions of severe usage. Another object is to provide a device of the above nature which is readily adaptable to a wide number of uses and which may be easily operated. Another object is to provide a device of the above nature which is inexpensive to manufacture and which may be produced under high production requirements. Other objects will be in part apparent and in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings in which are shown several of the various possible embodiments of my invention;

Figure 1 is a perspective view of my fastening device;

Figure 2 is an end elevation of the fastening device;

Figure 3 is a section of the fastening device taken along the line 3—3 of Figure 2;

Figure 4 is a side elevation of my device;

Figure 5 is a perspective view of complementary jaws of my device, the jaws being separated;

Figure 6 is an enlarged perspective view of the separator element used in my fastening device;

Figure 7 is a perspective view of a modification of the fastening device; and

Figure 8 is a perspective view of another modification of the fastening device, certain parts thereof being broken away.

Similar reference characters refer to similar parts throughout the several views of the drawings.

In order that certain features of this invention may be more readily understood, it might here be pointed out that various articles, as for example, fabric stretchers and curtain rods to which are attached various types of textile materials, have certain inherent disadvantages which react to the detriment of the textile secured thereto. A curtain stretcher, for example, is usually provided with a large number of small pins or nails which are passed through the fabric of the curtain being stretched to retain the curtain on the frame. As the curtain dries, a certain amount of shrinkage occurs, this shrinkage occasionally having the effect of ripping the curtain and in almost all cases leaving a scalloped edge which is difficult to remove and which mars the appearance of the curtain. While the above-noted disadvantages are not present in curtain rods, it is often quite difficult to hang the curtain on the curtain rod, this being the case when the curtain is quite long or when the hem or loop in the curtain through which the rod is passed is quite small. Still other fastening devices which are used in drying linens, for example, are in many cases unsatisfactory in that they either harm the material fastened thereto or the grip on the material is so insecure that the material often falls from its suspended position and becomes dirty or wrinkled or, in any event, fails to dry properly. Another object of this invention is to provide a fastening device which obviates the above conditions and disadvantages in addition to many others.

Referring now to the drawings and particularly to Figure 1, a plurality of upper jaws generally indicated at 10 and a plurality of lower jaws generally indicated at 11 are alternately secured to a bar 12 or the like. Jaws 10 and 11 are respectively provided with fastening or gripping teeth or shoes 10a and 11a which come together progressively upon operation of a fastener or locking device generally indicated at 13.

As is more clearly shown in Figure 5, upper jaw 10 comprises a base or supporting portion 14 and a slot 15 extends through base portion 14. An upper portion 16 extends from base portion 14 and to upper portion 16 there is secured a downwardly extending portion 17, gripping tooth 10a being formed on the end of downwardly extending portion 17. Gripping tooth 10a is preferably in the form of a shoe having a contacting surface 10b substantially wider than the thickness of upper jaw 10 and this for a purpose described hereinafter.

A post 18 extends downwardly from upper portion 16 and terminates in one element 19 of fastener or locking device 13. Element 19 preferably is wider than post 18 having shoulders 19a and 19b. The bottom edge of lower portion 19c of element 19 is preferably curved and is provided with a depression or cup 19d in one surface thereof and a projection 19e (Figure 3) on the other surface thereof. Element 19 has a hole 19f extending therethrough, this hole being provided for a purpose to be described hereinafter.

Lower jaw 11 (Figure 5) is substantially the counterpart of upper jaw 10, thus having a base portion 20, slot 21, bottom portion 22, upwardly extending portion 23, gripping tooth or shoe 11a, gripping surface 11b, post 24, fastener or locking element 25, shoulders 25c and 25d and hole 25e, element 25 thus being substantially the same as locking element 19 with the exception of its depression or cup 25a and projection 25b (Figure 3) which are on opposite sides of element 25 as compared to element 19.

Jaws 10 and 11 may be made in any suitable manner. However, they are preferably stamped out in an automatic or are automatically cast from any suitable metal. It is preferable to use a relatively rigid metal having a comparatively high modulus of elasticity.

Referring now to Figure 4, it may be seen that mounting bar 12 may be of any desirable length depending upon the length of fastener used. Preferably mounting bar 12 has formed on the ends thereof fastening portions 12a and 12b, these portions being preferably offset from the vertical plane of mounting bar 12. Portions 12a and 12b are respectively provided with holes 12c and 12d to accommodate a screw or similar fastening element. Under certain circumstances and conditions, however, it might be well to weld or solder the bar in place.

Still referring to Figure 4, it may be seen that upper jaws 10 and lower jaws 11 are offset with respect to one another. Thus, when the jaws are mounted on mounting bar 12 (it being noted that bar 12 extends through slots 15 and 21 of the upper and lower jaws respectively to hold the jaws in operative assembly) each upper jaw 10 is centered with respect to the adjacent pair of lower jaws 11 and, by the same token, each lower jaw 11 is centered with respect to the adjacent pair of upper jaws 10. This arrangement of the jaws permits the coaction between locking elements 19 and 25 of fastener 13 (Figure 1). It may also now be seen that by providing shoes 10a and 11a with broad contacting or gripping surfaces 10b and 11b, a continuous and smooth upper and lower gripping surface is obtained.

As is more clearly shown in Figure 3, upper locking element 19, when out of engagement with lower locking element 25, is spaced above and to one side of element 25. When all of the jaws are separated, elements 19 and 25 lie in this relative position but, when the jaws are in gripping relationship, projection 19e of upper locking element 19 extends into cup 25a (Figure 5) of the adjacent lower locking element 25 and accordingly all of the jaws are securely held in their gripping relationship.

In order to bring locking elements 19 and 25 into engagement or to separate them, I provide a separator or the like generally indicated at 26 (Figure 1). As is more clearly shown in Figure 6, separator 26 comprises an inner plate 27 and an outer plate 28 secured to opposite ends of a post or divider 29, this divider being preferably secured to the plates substantially at the center lines thereof. Plate 27 is provided with an upper flange 27a and a lower flange 27b and its left-hand vertical edge 27c is substantially longer than its right-hand vertical edge 27d, as viewed in Figure 6, flanges 27a and 27b preferably being slightly curved. Plate 28 is similarly provided with a curved upper flange 28a and a curved lower flange 28c and a left-hand edge 28c which is longer than its right-hand edge 28d. Preferably plates 27 and 28 are so spaced as to leave a slot 30 between upper flanges 27a and 28a and a slot 31 between lower flanges 27b and 28b.

As is more clearly shown in Figure 3, divider 29 is relatively short in comparison with flanges 28a and 28b. Preferably divider 29 is provided with a beveled forward edge 29a to facilitate the entry of the locking elements 19 and 25 into the divider. Thus plates 27 and 28 with their upper and lower curved flanges and divider 29 form a pair of converging channels (see Figure 3) which effect the interlocking or the disengagement progressively of adjacent upper and lower locking elements 19 and 25 (Figure 3) as the separator 26 is moved in one direction or the other, all as will be more fully described hereinafter.

Referring again to Figure 6, an operating post generally indicated at 32 is secured to outer plate 28. Thus post 32 comprises a portion 32a which is secured to the plate. Preferably portion 32a of post 32 is substantially perpendicular to outer plate 28 and then turns at right angles along portion 32b and extends a distance substantially beyond the left-hand edge of plate 28 as viewed in Figure 6. A portion 32c thence extends at an angle from portion 32b of the post and to portion 32c is secured a guiding or feeding element 33. Guide 33 is preferably formed of a substantially tubular metallic member having a slot 33a formed therein, this guide being provided for a purpose disclosed hereinafter.

Preferably post 32 (Figure 6) terminates at a point substantially spaced from the plane of the outer plate 28 when separator 26 is in its operative position. Thus, as is more clearly shown in Figure 2, portion 32c of post 32 extends well outside of jaws 10 and 11, that is the end of the post lies beyond outer portions 17 and 23 of the upper and lower jaws respectively.

When in its operative position, separator 26 (Figures 1, 2 and 3) houses several adjacent locking elements 19 and 25. As is more clearly shown in Figure 3, upper element 19 lies in the above-noted upper channel in separator 26 while lower elements 25 lie in the above-noted lower channel in separator 26, the elements being spaced from one another at the left-hand or entry end (as viewed in Figure 3) of the separator and being interlocked at the right-hand or exit end of the separator, the interlocking engagement being effected during movement of the separator from right to left. As separator 26 is given this right to left movement, lower flanges 27b and 28b of separator plates 27 and 28 engage beneath the shoulders 25a and 25b of lower locking elements 25 while upper flanges 27a and 28a of plates 27 and 28 engage shoulders 19a and 19b (Figure 5) of upper locking elements 19, the elements 19 (Figure 3) having been raised to their flange engaging position by the entry of edge 29b of divider 29 under rounded portion 19c (Figure 5) of the locking element. As separator 26 (Figure 3) continues its movement, the curved flanges 28a, 28b, 27a, and 27b move the elements toward one another and impart to them a slight pivotal motion, this pivotal motion being a clockwise motion with respect to the upper elements and a counterclockwise motion with respect to the lower elements in a direction away from the normal axis of posts 18 and 24, upper post 18 extending through slot 30 (Figure 6) and lower post 24 (Figure 3) extending through lower slot 31 (Figure 6) of the separator.

As the locking elements approach the right-hand end of the separator, a reverse pivotal movement of the elements back to the line of the normal axis of posts 18 and 24 occurs and during this movement upper element projections 19e engage in adjacent lower element cups 25a (Figure 5) and, by the same token, lower element projections 25b (Figure 3) engage in adjacent upper element cups 19f (Figure 5) thus effecting an interlocking of adjacent elements. It will be noted that during this engaging action, adjacent upper and lower jaws are respectively moved downwardly and upwardly into gripping relationship, slots 15 and 21 (Figure 5) each being sufficiently larger than bar 12 (Figure 1) to permit relative movement of the jaws into or out of gripping position.

Still referring to Figure 3, when separator 26 is moved from left to right, that is when the separator is moved to disengage locking elements 19 and 25 to effect the separation of jaws 10 and 11, the locking elements enter the right-hand end of separator 26 in engaged relation and exit from the left-hand end of the separator disengaged. During the movement of the locking elements through the separator, a substantially reverse operation occurs with respect to the engaging operation described immediately above. Thus the inner or right-hand edge 29b of divider 29 acts as a wedge between upper and lower elements 19 and 25 causing clockwise pivoting of upper elements 19 and counterclockwise pivoting of lower elements 25 during which pivotal movement of the projections and cups of each become disengaged. Subsequent to this disengagement, the elements pivot back into the normal axis of posts 18 and 24 and, as the elements approach the left-hand end of separator 26, upper and lower jaws 10 and 11 are separated a maximum distance. However, after elements 19 and 25 leave the separator, upper elements 19 and accordingly upper jaws 10 fall a slight amount until the top of slot 15 (Figure 5) abuts the top of bar 12 (Figure 4), there being, however, sufficient space between the upper and lower jaws to accommodate operating post 32.

As is more clearly shown in Figures 2 and 4, there is sufficient space between the upper and lower jaws when they are disengaged to permit the extension therethrough of operating post 32. Thus the operator of the fastening device may grip the end of portion 32c of operating post 32 and move it one way or the other, as pointed out above, to slide separator 26 in one direction or the other to engage or disengage the locking elements 19 and 25. It may also be noted that through the provision of portions 32b and 32c (Figure 6) the end of post 32 (Figure 4) which extends between and outside of jaws 10 and 11 is substantially spaced from separator 26 and accordingly is not impeded in its movement by jaws in gripping position.

Under certain circumstances, I prefer to provide plate 28 (Figure 6) of separator 26 with a pair of eyes 80 and 81 or the like to each of which may be attached a cord or the like (not shown) by which operation of the separator may be effected rather than by operating post 32. When such cords or wires are provided preferably operating post 32 is not provided. Thus the cord attached to eye 81 lies within jaws 10 and 11 (Figure 1) or jaws 65 and 71 (Figure 8) extending through the left-hand end thereof, as viewed in Figures 1 and 8, there being sufficient cord provided so that the end of the cord may be grasped when the separator is at its extreme right-hand position. Similarly, the cord attached to eye 80 (Figure 6) lies within jaws 10 and 11 (Figure 1) or jaws 65 and 71 (Figure 8) and extends from the right-hand end thereof, as viewed in Figures 1 and 8, sufficient cord being provided so that the end thereof may be readily grasped when the separator is at the extreme left-hand end of its operation. Thus it may be seen that separator 26 may be operated in one direction or the other by pulling the correct cord.

In order to facilitate the entry of upper locking elements 19 (Figures 1 and 2) into the upper channel in separator 26, I have provided preferably a resilient wire 34 which extends through upper element holes 19f (Figure 5). As is more clearly shown in Figure 3, as the locking elements enter the separator, wire 34 effects the raising of locking elements 19 next succeeding the entering elements before the entry of the next succeeding elements into the entry end of separator 26. Similarly I provide a wire 35 extending through holes in lower elements 25 similar to upper element holes 19f to effect a premature raising of lower elements 25 before their entrance into separator 26. While the provision of wires 34 and 35 is not essential to the operation of the device, its provision facilitates the operation and under certain circumstances is desirable.

With reference now to Figure 2, it may be seen that guiding or feeding element 33 preferably lies wholly within upper and lower jaws 10 and 11. If for example, a curtain is being suspended from the fastening device, the edge of the curtain will probably be hemmed and such a hem may be introduced into guide 33 and, as post 32 is moved along to operate separator 26, the curtain will be automatically fed by guide 33 between the jaws after the first portion of the curtain has been gripped, thus avoiding the necessity of feeding the curtain between the jaws by hand.

It may now be seen that the jaws of my fastening or locking device close or open progressively as separator 26 is moved in one direction or the other; it thus becomes manifest that the securing of a textile material, for example, may be effected in an extremely efficient manner in a relatively short space of time. It may also be seen that the various portions of the fastening device may be formed and proportioned to accommodate various types and thicknesses of materials. For example, it might be desirable to suspend sheets of rubber or the like for purposes of drying or other purposes. Under such conditions, it might be more desirable to provide sharp points rather than shoes 10a and 11a on upper and lower jaws 10 and 11 respectively.

With reference now to Figure 7 in which I have shown another embodiment of my invention, I provide a plurality of jaws pivoted adjacent one another on a common pivot, the jaws being progressively engageable upon actuation of a fastener or locking device generally similar to fastener 13 (Figure 1). Thus each pair of jaws includes a jaw generally indicated at 40 and a jaw generally indicated at 41. Jaw 40 comprises a gripping portion 42 and a separating portion 43, both portions preferably being integral with a pivot hub 44. In this instance, jaw 40 is shown provided with a sharp gripping tooth 45 rather than a shoe similar to shoe 10a of jaw 10 (Figure 5). Preferably portion 42 of jaw 40 is anchored in any suitable manner to a base or support 46 and is accordingly immovable in relation thereto. Jaws 41 are substantially similar to jaws 40 thus comprising a gripping portion 47 and a separating portion 48, these portions preferably being integral with a pivot hub 49. A common pivot pin 50 extends through all of hubs 44 and 49 thus pivotally relating adjacent jaws. It may now be seen that all of jaws 40 being secured to base 46 are immovable whereas jaws 41 are free to pivot with respect to this base.

Extending inwardly toward each other from separating portions 43 and 48 of jaws 40 and 41 respectively are upper portions 51 and 52. A pliable tape 53 is secured in any suitable manner to upper portions 51 and a pliable tape 54 is secured in any suitable manner to upper portions 52. Attached in any desirable manner to tape 53 are a series of locking elements 55 similar to locking elements 19 (Figure 5), while a series of locking elements 56 (Figure 7) similar to locking elements 25 (Figure 5) are secured to tape 54. A separator 57 is operatively associated with locking elements 55 and 56, as pointed out above with respect to separator 26. Thus operation of the separator 57 to the right, as viewed in Figure 7, effects the disengagement of locking elements 55 and 56, whereas operation of the separator 57 to the left effects the engagement of the locking elements 55 and 56. When locking elements 55 and 56 are brought into interlocking relationship, jaws 41 are progressively pivoted into a gripping position with relation to jaws 40, the jaws separating from their gripping relationship upon right-hand movement of the separator 57, that is upon disengagement of the locking elements 55 and 56.

If desirable, the locking elements 55 and 56 shown in Figure 7 may be provided with means similar to bar 12 (Figure 1) and slots 15 and 21 (Figure 5) to maintain the jaws 40 and 41 in operative relationship. Under certain circumstances, however, the pivotal relationship is preferable.

In the embodiment of my fastening or locking device shown in Figure 8, I provide a base 60 to which is attached a substantially U-shaped metal strip or the like 61 as by pins or screws 62. A strip of preferably pliable tape 63 or the like is clamped within U-shaped strip 61 being held therein by pins or screws 62. To the lower or depending edge 63a of tape 63, I secure in any suitable manner a plurality of upper locking elements 64, these elements being regularly spaced along edge 63a of the tape and being substantially similar to upper locking elements 19 (Figure 5) the principal difference being that there is no hole provided in locking elements 64 similar to hole 19d in locking elements 19 except as noted hereinafter. Extending preferably upwardly, outwardly and thence downwardly from each of upper locking elements 64 (Figure 8) is a substantially U-shaped gripping member or jaw 65 on the end of which is formed a shoe 65a substantially similar to shoe 10a of jaw 10 (Figure 5).

Another substantially U-shaped metal strip 66 (Figure 8) preferably the counterpart of U-shaped strip 61 has disposed in clamping relation thereto a preferably pliable tape 67 substantially similar to tape 63 and secured between the folds of strip 66 by pins or rivets 68. The upper edge 67a of pliable tape 67, which is adjacent edge 63a of tape 63, has secured thereto in any suitable manner a plurality of regularly spaced lower locking elements 69, these lower locking elements being substantially similar to lower fastener elements 25 (Figure 5), the principal difference being that there is no hole provided in locking elements 69 similar to hole 25e in locking elements 25 except as noted hereinafter. Thus upper locking elements 64 and lower locking elements 69 are complementary to one another and may be brought into operative relationship upon actuation of a separator element 70 which is substantially similar to separator element 26 (Figure 6). The engagement and disengagement of locking elements 64 (Figure 8) and 69 is effected through the actuation of separator 70 in substantially the same manner as pointed out hereinabove with respect to separator 26 and locking elements 19 and 25.

Extending preferably downwardly, thence outwardly and thence upwardly from each of lower locking elements 69 (Figure 8) is a lower jaw 71, each lower jaw preferably having formed on the edge thereof a shoe or the like 71a these shoes being substantially similar to upper shoes 65a. Thus, when all of shoes 71a or all of shoes 65a are aligned either in gripping position or in separated position, the gripping surfaces of the shoes present a substantially unbroken and smooth surface adapted to engage a woven material or the like.

Preferably separator 70 (Figure 8) is provided with an operating rod 70a substantially similar to operating rod or post 32 of separator 26 (Figure 6) and is further provided with a guide or feeding member (not shown) substantially similar to guide or feeding member 33.

It may now be seen that operation of separator 70 effects engagement or disengagement of locking elements 64 and 69 depending upon the direction of operation of the separator, and engagement or disengagement of the locking elements in turn effects successive actuation of jaws 65 and 71 in gripping or upgripping directions in substantially the same manner as pointed out above with respect to jaws 10 and 11 (Figure 1).

In order that lower jaws 71 (Figure 8) do not fall too far away from upper jaws 65 when the jaws are in disengaged relation, I preferably secure together locking elements 64 and 69 at each end of the group or assembly of jaws. Thus, as is shown in Figure 8, locking elements 64 and 69 at the left of the group of jaws are in constant inseparable engagement, being maintained in this relationship in any suitable manner, as, for example, by soldering or welding two or three sets of locking elements. As these locking elements so joined are inseparable, the end of metal strip 66 lying directly beneath the joined locking elements does not fall out of position when adjacent locking elements are disengaged. For this reason the jaws 65 and 71 at the end of the group are in constant engagement and accordingly conveniently form an abutment against which operating post 70a may abut to limit its movement to the left as viewed in Figure 8. As pointed out above, the other or right-hand end of the unit preferably has its end locking elements (not shown) inseparably joined. Accordingly separator element 70 has definite limitations of movement in both directions and cannot be completely disengaged from locking elements 64 and 69. Under certain circumstances, however, it might be preferable to leave the end locking elements 64 and 69 of a unit unsecured in which event separator 70 could be freely moved out of engagement and operative association with the jaws.

With further reference to Figure 8, it may be seen that when jaws 65 and 71 are in spaced relationship due to their disengagement, their respective tapes 63 and 67 are slightly buckled but while these tapes are pliable they are not so pliable as to permit jaws 65 and 71 to fall so far out of line as to make it difficult for separator 70 to collect locking elements 64 and 69 and cause the interengagement thereof. Under certain circumstances it might be desirable to provide wires similar to wires 34 and 35 (Figures 1 and 2) to hold locking elements 64 and 69 in substantial alignment and under such circumstances it is my intention that such wires extend through locking elements 64 and 69 as in the case of locking elements 19 and 25 (Figure 1).

It is readily apparent that jaws 10 and 11 (Figure 1) or jaws 40 and 41 (Figure 7) or jaws 65 and 71 (Figure 8) may be finished in any desirable manner or may be suitably decorated according to the purpose to which the fastening device is to be put. For example, if the fastening device is to be used as a means for hanging a curtain, the jaws of the fastening device may be decorated to blend harmoniously with the color or colors of the curtain suspended thereby.

Accordingly it may now be seen that I have provided a gripping device which efficiently attains the objects set forth hereinabove in addition to many others in a thoroughly practical manner.

As many possible embodiments may be made of the above invention and as many changes might be made in the embodiment above set forth, it is to be understood that all matter hereinbefore set forth, or shown in the accompanying drawings, is to be interpreted as illustrative and not in a limiting sense.

I claim:

1. In a fastening device, in combination, a plurality of substantially U-shaped upper jaws, a plurality of U-shaped lower jaws, means operatively connecting said upper and lower jaws whereby a plurality of individual gripping members are formed, a locking element associated with each of said jaws, and a separator associated with said locking elements and movable in one direction to effect successive interengagement of said locking members whereby said gripping members successively close, said separator being movable in the opposite direction to disengage successively said locking elements whereby said gripping members are successively opened.

2. In a fastening device, in combination, a plurality of upper gripping members, a plurality of lower gripping members, means associated with said members for maintaining them in operative relationship, an integral post extending downwardly from each of said upper members, an integral post extending upwardly from each of said lower members, a locking element on each of said posts, and means for successively bringing said upper locking elements into interlocking engagement with said lower locking elements whereby said upper gripping members and said lower gripping members are successively moved into gripping relationship.

3. In a fastening device, in combination, a plurality of upper jaws, a plurality of lower jaws, a locking element on each of said jaws, means securing said jaws together in operable relationship, the locking elements on said upper jaws being adapted to be drawn successively into interlocking engagement with the locking elements on said lower jaws, a sliding member disposed about said locking elements and movable in one direction to interlock adjacent upper and lower elements, said sliding member being operable in the opposite direction to separate successively said locking elements.

4. In a fastening device, in combination, a plurality of upper jaws, a plurality of lower jaws, means associated with said jaws for maintaining them in operative relationship, a locking element secured to each of said jaws, and means movably related to said locking elements for effecting interlocking thereof whereby said jaws are drawn into gripping relationship.

5. In a fastening device, in combination, a plurality of pairs of linearly aligned pivotable jaws having a common pivotal axis, means pivotally supporting said jaws in operative relationship, operating means extending from said jaws, and means operatively associated with said last-mentioned means and movable in one linear direction to open said jaws successively, said last-mentioned means being movable in another linear direction to close said jaws.

6. In a fastening device, in combination, a rigid support, a pair of pliable members associated with said support, locking elements secured to said pliable members, gripping means associated with and movable with said locking elements, and means operatively related to said locking elements and movable to effect locking thereof for effecting a gripping relationship between said gripping means.

7. In a fastening device, in combination, a support, a pair of juxtaposed pliable members, means for securing said pliable members to said support, a plurality of axially aligned gripping members secured to said pliable members and formed and adapted to grip material therebetween, and means for bringing said gripping members into gripping relation with said material.

8. In a fastening device, in combination, a pair of pliable members, a plurality of movable locking elements secured to each of said pliable members, a gripping member secured to and extending from each of said locking elements, said gripping members being formed and adapted to grip material therebetween and a part operatively associated with said locking elements and movable in one direction to effect successive interengagement of said locking elements whereby said gripping members are successively moved into gripping relationship, said part being operable in another direction to effect successive disengagement of said locking elements whereby said gripping members are successively disengaged from their gripping position.

9. In a fastening device, in combination, a support, a pair of strip members associated with said support, said strip members lying in substantial parallelism, a pliable tape disposed between each of said strip members and said support, a plurality of regularly spaced locking elements secured to adjacent edges of said tapes, the opposite ends of said tapes being secured together in inseparable relationship, a jaw member secured to and extending from each of said fastener elements and a separator part operatively associated with said locking elements and movable in one direction to effect successive interengagement of said locking elements whereby said jaw members are successively moved into gripping position, said separator part being movable in another direction to successively disengage said locking elements whereby said jaw members are successively moved out of gripping position.

10. As an article of manufacture, a pair of flanged plate members, means securing said plate members in spaced relationship for receiving interlocking members, an operating post rigidly secured to one of said plate members and extending outwardly therefrom, and a guide part secured to said operating post for guiding a curtain hem or the like toward said plate members.

11. In a fastening device, in combination, an elongated fastening device having a longitudinal slot formed therein adapted to receive a material to be gripped by said fastening device, and a member operatively associated with said device and movable longitudinally therealong to close said slot as said member moves, whereby said material is gripped.

12. In a fastening device, in combination, a support, a pair of flexible members secured to said support, interlocking members secured to said flexible members in staggered relation, each of said interlocking members having a recess on one side and a projection on the other, a gripping part extending from each of said elements and adapted upon interlocking movement of said elements to move into gripping position, and means for interlocking said elements.

13. In a fastening device, in combination, a support, a pair of flexible members secured to said support, interlocking elements secured to said flexible members in staggered relation, each of said interlocking members having a recess on one side and a projection on the other, gripping means connected to the interlocking elements secured to one of said pliable members, complementary gripping means secured to the interlocking elements secured to the other of said pliable members, both of said gripping means being adapted upon interlocking movement of said elements to grip material therebetween, and means for interlocking said elements.

14. In a fastening device, in combination, a plurality of pairs of jaws, a locking element secured to each of said jaws, and means movably related to and successively engageable with said locking elements for effecting automatic interlocking thereof, whereby said jaws are drawn into gripping relationship.

15. In a fastening device, in combination, a plurality of pairs of jaws, an arm extending from each jaw, a locking element secured to each arm, and means movably related to and successively engageable with said locking elements for effecting automatic interlocking thereof, whereby said arms are moved to place said jaws into gripping relationship.

KALMAN J. KORTVELESY.